United States Patent Office 3,637,724
Patented Jan. 25, 1972

3,637,724
BENZOTHIADIAZOLE SALICYLAMIDES
Peter Kirby, Kent, England, assignor to Shell Oil
Company, New York, N.Y.
No Drawing. Filed Jan. 23, 1970, Ser. No. 5,425
Int. Cl. C07d 91/56
U.S. Cl. 260—304                    7 Claims

ABSTRACT OF THE DISCLOSURE

Certain novel N-(1,2,3-benzothiadiazolyl)-salicylamides, useful as cesticides.

BACKGROUND OF THE INVENTION

Field of the invention

This invention relates to a series of novel substituted N-(1,2,3,benzothiadiazolyl)-salicylamides which are effective anthelmintics, giving outstanding control of cestodes that infest warm-blooded animals.

Description of prior art

A search of the prior art did not elucidate any previous disclosure of N-(1,2,3-benzothiadiazolyl)-salicylamide structure. In French Pat. 1,541,415 a general class of 1,2,3-benzothiodiazoles having bonded to the benzene ring various functional groups including a structure labeled, only generally, as substituted hydrocarbon were disclosed. Other substituted 1,2,3-benzothiadiazoles have been disclosed in U.S. Pats. 3,275,647 and 3,320,123 and in French Pat. 1,369,645.

SUMMARY OF THE INVENTION

It has now been found that N-(1,2,3-benzothiadiazolyl)-salicylamides substituted on the aromatic nuclei with electron-withdrawing groups are useful as cesticides, showing high activity in the control of tapeworm infections in warm-blooded animals while being non-toxic to the host animals at the cesticidally effective dosages.

This invention accordingly is a new class of N-(1,2,3-benzothiadiazolyl)-salicylamides having substituted on one or both aromatic nuclei electron-withdrawing groups, their use as cesticides and cesticidal formulations containing them.

DESCRIPTION OF THE PREFERRED EMBODIMENTS

The novel compounds of this invention can be described by the general formula:

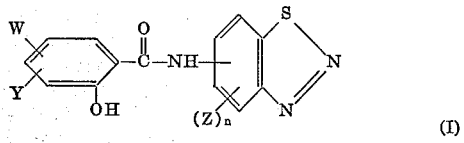

wherein W represents halogen, nitro, trifluoromethyl, methylsulfonyl or cyano; Y and Z each can be hydrogen or one of the moieties represented by W, n is 1 to 2.
Examples of the general formula include:

5-chloro-N-(6-bromo-1,2,3-benzothiadiazol-7-yl)-salicylamide;
5-chloro-N-(4,6-dibromo-1,2,3-benzothiadiazol-7-yl)-salicylamide;
3,5-dichloro-N-(4,6-dibromo-1,2,3-benzothiadiazol-7-yl)-salicylamide;
5-bromo-N-(4-chloro-1,2,3-benzothiadiazol-6-yl)-salicylamide;
3,5-dibromo-N-(4,6-dichloro-1,2,3-benzothiadiazol-7-yl)-salicylamide;
5-bromo-N-(6-chloro-1,2,3-benzothiadiazol-7-yl)-salicylamide;
3,5-dibromo-N-(6-chloro-1,2,3-benzothiadiazol-7-yl)-salicylamide;
5-chloro-N-(6-nitro-1,2,3,-benzothiadiazol-7-yl)-salicylamide;
5-chloro-N-(4,6-dinitro-1,2,3,-benzothiadiazol-7-yl)-salicylamide;
3,5-dichloro-N-(6-nitro-1,2,3-benzothiadiazol-7-yl)-salicylamide;
5-bromo-N-(6-nitro-1,2,3,-benzothiadiazol-7-yl)-salicylamide;
3,5-dibromo-N-(4,6-dinitro-1,2,3-benzothiadiazol-7-yl)-salicylamide;
5-nitro-N-(6-chloro-1,2,3-benzothiadiazol-7-yl)-salicylamide;
3,5-dinitro-N-(4,6-dichloro-1,2,3-benzothiadiazol-7-yl)-salicylamide;
5-nitro-N-(6-bromo-1,2,3-benzothiadiazol-7-yl)-salicylamide;
3,5-dinitro-N-(4,6-dibromo-1,2,3-benzothiadiazol-7-yl)-salicylamide;
5-nitro-N-(6-nitro-1,2,3-benzothiadiazol-7-yl)-salicylamide;
3,5-dinitro-N-(6-nitro-1,2,3-benzothiadiazol-7-yl)-salicylamide;
5-nitro-N-(4,6-dinitro-1,2,3-benzothiadiazol-7-yl)-salicylamide;
5-trifluoromethyl-N-(6-chloro-1,2,3-benzothiadiazol-7-yl)-salicylamide;
3-chloro-5-trifluoromethyl-(4,6-dichloro-1,2,3-benzothiadiazol-7-yl)-salicylamide;
5-trifluoromethyl-N-(4,6-dichloro-1,2,3-benzothiadiazol-7-yl)-salicylamide;
5-trifluoromethyl-N-(6-trifluoromethyl-1,2,3-benzothiadiazol-7-yl)-salicylamide;
3,5-dibromo-N-(6-trifluoromethyl-1,2,3-benzothiadiazol-7-yl)-salicylamide;
5-trifluoromethyl-N-(4,6-dinitro-1,2,3-benzothiadiazol-7-yl)-salicylamide;
3,5-dinitro-N-(6-trifluoromethyl-1,2,3-benzothiadiazol-7-yl)-salicylamide;
3-nitro-5-chloro-N-(4,6-dinitro-1,2,3-benzothiadiazol-7-yl)-salicylamide;
3-bromo-5-nitro-N-(4-nitro-6-chloro-1,2,3-benzothiadiazol-7-yl)-salicylamide;
5-cyano-N-(6-chloro-1,2,3-benzothiadiazol-7-yl)-salicylamide;
3,5-dichloro-N-(6-cyano-1,2,3-benzothiadiazol-7-yl)-salicylamide;
3,5-dicyano-N-(4,6-dichloro-1,2,3-benzothiadiazol-7-yl)-salicylamide;
3-nitro-5-chloro-N-(4,6-dicyano-1,2,3-benzothiadiazol-7-yl)-salicylamide;
5-chloro-N-(7-bromo-1,2,3-benzothiadiazol-6-yl)-salicylamide;
3,5-dichloro-N-(4,7-dibromo-1,2,3-benzothiadiazol-6-yl)-salicylamide;
5-bromo-N-(1,2,3-benzothiadiazol-6-yl)-salicylamide;
3,5-dibromo-N-(4,7-dichloro-1,2,3,-benzothiadiazol-6-yl)-salicylamide;
5-bromo-N-(7-chloro-1,2,3-benzothiadiazol-6-yl)-salicylamide;
3,5-dibromo-N-(1,2,3-benzothiadiazol-7-yl)-salicylamide;
5-chloro-N-(7-nitro-1,2,3-benzothiadiazol-6-yl)-salicylamide;
5-chloro-N-(4,7-dinitro-1,2,3-benzothiadiazol-6-yl)-salicylamide;
3,5-dichloro-N-(6-nitro-1,2,3-benzothiadiazol-7-yl)-salicylamide;

5-bromo-N-(6-nitro-1,2,3-benzothiadiazol-7-yl)-
salicylamide;
3,5-dibromo-N-(4,7-dinitro-1,2,3-benzothiadiazol-6-yl)-
salicylamide;
5-nitro-N-(1,2,3-benzothiadiazol-7-yl)-salicylamide;
3,5-dinitro-N-(4,7-dichloro-1,2,3-benzothiadiazol-
6-yl)-salicylamide;
5-nitro-N-(1,2,3-benzothiadiazol-6-yl)-salicylamide;
3,5-dinitro-N-(4,7-dibromo-1,2,3-benzothiadiazol-
6-yl)-salicylamide;
5-nitro-N-(1,2,3-benzothiadiazol-6-yl)-salicylamide;
5-nitro-N-(4,7-dinitro-1,2,3-benzothiadiazol-6-yl)-
salicylamide;
5-trifluoromethyl-N-(6-chloro-1,2,3-benzothiadiazol-
6-yl)-salicylamide;
3-chloro-5-trifluoromethyl-N-(1,2,3-benzothiadiazol-
7-yl)-salicylamide;
5-chloro-N-(6-methylsulfonyl-1,2,3-benzothiadiazol-
7-yl)-salicylamide;
5-chloro-N-(4,6-diamethylsulfonyl-1,2,3-benzothiadiazol-
7-yl)-salicylamide;
5-methylsulfonyl-N-(4,6-dibromo-1,2,3-benzothiadiazol-
7-yl)-salicylamide;
5-methylsulfonyl-N-(4-chloro-1,2,3-benzothiadiazol-
6-yl)-salicylamide;
5-methylsulfonyl-N-(4,6-dichloro-1,2,3-benzothiadiazol-
7-yl)-salicylamide.

Highest cesticidal activity appears to be associated with the subclass wherein W represents a middle halogen (chlorine or bromine); Y is hydrogen or middle halogen; Z is hydrogen or middle halogen; $n$ is 1 or 2. Preferred species of the subclass include compounds wherein W is chlorine, Y and Z are hydrogen or chlorine and $n$ is 1 or 2.

Examples of the subclass include 5-chloro-N-(1.2.3-benzothiadiazol-6-yl) - salicylamide; 5 - chloro-N-(1,2,3-benzothiadiazol-7-yl)-salicylamide; 5 - chloro - N -(6-chloro - 1,2,3 - benzothiadiazol - 7 -yl)-salicylamide; 5-cholor - N - (4,6 - dichloro - 1,2,3-benzothiadiazol-7-yl)-salicylamide.

Biologically active compounds of this invention may be prepared by the reaction of the substituted aminobenzothiadiazole of Formula II:

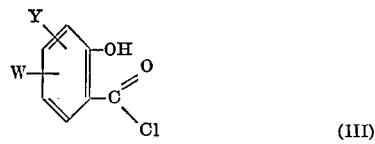

wherein Z and $n$ are as defined above, with a substituted salicyloyl chloride of Formula III:

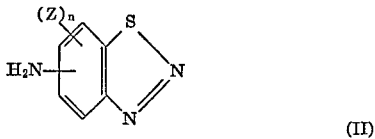

wherein W and Y are as defined above. The reaction is suitably carried out in a halogenated aromatic solvent such as chlorobenzene at reaction temperatures ranging from 25 to 100° C. and reaction times of 1 to 46 hours.

Aminobenzothiadiazoles of Formula I can be prepared by several different techniques starting with materials like substituted aniline hydrochloride or substituted mercaptoaniline.

One route which has been found to be convenient involves the conversion of the appropriately substituted aniline hydrochloride to a thiazathiolium salt (Herz compound) using the Herz synthesis. The thiazathiolium salt is then diazotized with nitrous acid to form the substituted 1,2,3-benzothiadiazole. The benzothiadiazole is then nitrated with an appropriate nitrating agent such as potassium nitrate in concentrated sulfuric acid and the product is reduced with a reducing agent such as stannous chloride in a mixture of ethanol and concentrated hydrochloric acid to yield the desired aminobenzothiadiazole.

Amino-1,2,3-benzothiadiazoles can also be prepared from 2-mercaptoanilines using the diazotization technique first described by Berthsen (Chem. Ztg., 12, 1318 (1888). Using the technique described by Hodgson and Dodgson (J. Chem. Soc. (1948), 1006) nitro-1,2,3-benzothiadiazoles can be prepared from nitro-substituted 2-mercaptoanilines. The nitro-1,2,3-benzothiadiazole can then be reduced with an agent such as stannous chloride to yield the desired amino-1,2,3-benzothiadiazole.

The compounds of the invention, processes for their preparation and their biological activity are illustrated by the following examples, in which parts by weight (w.) and parts by volume (v.) bear the same relation as the kilogram to the liter and all temperatures are in degrees centigrade:

EXAMPLE I 5-chloro-N-(6-chloro-1,2,3-benzothiadiazol-
7-yl)-salicylamide

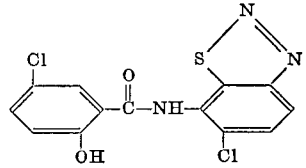

Aniline hydrochloride (52 w.) was added to sulfur monochloride (375 w.) and the mixture was stirred at 65° for 4 hours, benzene (200 v.) was then added and the mixture was allowed to cool before filtering and washing the residue of 6-chloro-1,3,2-benzothiazathiolium chloride with further portions of benzene.

A sample of 6-chloro-1,3,2-benzothiazathiolium chloride (80 w.) obtained in this manner was added to 50% sulfuric acid (400 v.) at 60° and a small quantity of tar was removed by filtration through glass wool. The filtrate was cooled to 0° and sodium nitrite solution (40 w. in 40 v. water) added with stirring. Stirring was continued at 0° for 1 hour after completion of the addition and the reaction mixture was then poured into ice (2000 v.) and allowed to stand for further 2 hours. This mixture was extracted with diethyl ether (3 × 200 v.), the extracts were dried over magnesium sulfate and the solvent was removed by evaporation. The residue obtained in this manner was purified by chromatography on a silica-gel column using methylene chloride as eluent solvent to give 6-chloro-1,2,3-benzothiadiazole as yellow crystals M.P. 74–75° C. The structure was confirmed by elemental analysis.

6-chloro-1,2,3-benzothiadiazole (15 w.) was dissolved in concentrated sulfuric acid (60 v.) and potassium nitrate (13 w.) was added slowly at ambient temperature. After the addition the mixture was heated at 100° C. for 2 hours. The mixture was poured into the water and the solid (9 w.) was filtered off. Separation in a silica-gel column using methylene chloride and petroleum ether yielded 6-chloro-7-nitro-1,2,3-benzothiadiazole (2.7 w.), M.P. 99–101°. The structure was confirmed by elemental analysis.

6-chloro-7-nitro-1,2,3-benzothiadiazole (8 w.), ethanol (40 v.) and concentrated HCl (60 v.) were warmed to 60°. Stannous chloride (50 w.) was added, keeping the temperature at 60°. The mixture was heated at 60° for one hour, cooled and poured into 30% potassium hydroxide solution. The yellow solid was extracted with chloroform, the chloroform layer was dried and evaporated. The yellow residue was purified by chromatography and recrystallization from isopropyl alcohol to yield 6-chloro-7-amino-1,2,3-benzothiadiazole (2 w.), M.P. 157°. The structure was confirmed by elemental analysis.

6-chloro-7-amino-1,2,3-benzothiadiazole (1.8 w.) and 5-chloro-salicyloyl chloride (2 w.) in chlorobenzene (30 v.) were heated on a steam bath for one hour. The reaction mixture was cooled and filtered, and the residue was recrystallized from ethanol to yield 5-chloro-N-(6-chloro-1,2,3-benzothiadiazol-7-yl)-salicylamide melting at 246°. The structure was confirmed by elemental and infrared spectrum analyses.

*Analysis.*—Calculated (percent by weight): Cl, 20.8; N, 12.35. Found (percent by weight): Cl, 20.7; N, 11.8.

*Analysis.*—Calculated (percent by weight): C, 41.7; H, 1.6; N, 11.2. Found (percent by weight): C, 42.7; H, 1.9; N, 11.1.

EXAMPLE III

Following procedures similar to those previously described other species were prepared:

| Compound | Point (°C.) | Calculated | | | Found | | |
|---|---|---|---|---|---|---|---|
| | | N | Cl | S | N | Cl | S |
| N-(1,2,3-benzothiadiazol-6-yl)-5-chloro-salicylamide | 255–256 | 13.8 | 11.6 | 10.5 | 13.9 | 11.8 | 10.7 |
| N-(1,2,3-benzothiadiazol-7-yl)-5-chloro-salicylamide | 205–207 | 13.8 | 11.6 | | 13.1 | 11.5 | |

EXAMPLE II

5 - chloro - N - (4,6 - dichloro-1,2,3-benzothiadiazol-7-yl)-salicylamide

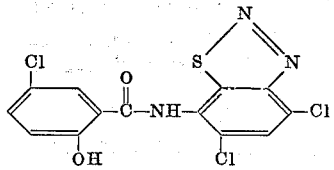

2-chloroaniline (200 v.) was dissolved in glacial acetic acid (220 v.) and added below 30° to sulfur monochloride (1000 v.). The mixture was then heated at 60° for 5 hours. Benzene (1000 v.) was added and the mixture was filtered to yield a brown solid. The solid was dissolved in 50% sulfuric acid (1500 v.) and diazotized below 0° using sodium nitrite (200 w.). After the diazotization was complete the mixture was poured on to ice and left for three hours. The mixture was filtered and the solid was dissolved in ether. The ether layer was washed with sodium hydroxide solution and then water. Evaporation of the ether solution gave a brown oil (100 w.). This was crystallized from ethanol to give pale yellow crystals of 4,6-dichloro-1,2,3-benzothiadiazole (20 w.), M.P. 84–86°. The structure was confirmed by elemental analysis.

4,6-dichloro-1,2,3-benzothiadiazole (16 w.) was dissolved in concentrated sulfuric acid (100 v.) and potassium nitrate (14 w.) was added slowly at room temperature. The mixture was then heated at 90° for 5 hours. The mixture was then cooled and poured into ice yielding a yellow solid. This was filtered off and crystallized from ethanol to give 4,6-dichloro-7-nitro-1,2,3-benzothiadiazole (14 w.) M.P. 132–134°. The structure was confirmed by elemental analysis.

4,6-dichloro-7-nitro - 1,2,3 - benzothiadiazole (0.9 w.) was dissolved in hot glacial acetic acid (20 v.) and iron powder (2 w.) was added over the course of half an hour. The mixture was heated on a water bath for a further 2 hours and filtered hot. The filtrate was poured into water and the mixture was extracted with ether. The ether layer was dried and evaporated to yield bright yellow crystals of 4,6-dichloro-7-amino - 1,2,3 - benzothiadiazole (0.6 w.), M.P. 167–168°. The structure was confirmed by elemental analysis. 4,6-dichloro-7-amino-1,2,3-benzothiadiaole (1.2 w.) and 5-chloro-salicyloyl chloride (0.95 w.) in chlorobenzene (20 v.) were heated on a steam bath for 46 hours. The reaction mixture was cooled and filtered. Separation in a silica-gel column using ethanol yielded 5-chloro-N-(4,6-dichloro - 1,2,3-benzothiadiazol-7-yl)-salicylamide melting at 239.5–240.5°. The structure was confirmed by elemental and infra-red spectrum analyses.

EXAMPLE IV

The biological activity of the compounds of this invention with respect to helminth parasites in the class cestoda, and their relatively low toxicity with respect to the host animals—that is, their high safety factors—was demonstrated by the following tests:

Mammalian toxicity

This is defined as the maximum tolerated dosage, milligrams of test compound per kilogram of animal body weight, and was determined as follows: by intubation a group of mice was treated with a dosage of 1000 milligrams of test compound per kilogram of mouse body weight. If any of the mice died, further groups of mice were treated with successively smaller dosages of the test compound, until a dosage was found that all of the mice survived. This is recorded as the maximum tolerated dose.

Anthelmintic activity

This is reported as the minimum effective dosage, milligrams of test compound per kilogram of animal body weight, to effect a certain standard of clearance of parasites from the host animal. It was determined in any given case as follows: A group of 5 mice, parasitized by tapeworm (*Hymenolepis nana*) was treated, by intubation, with a single dose of the test compound, the dosage being near but less than the maximum tolerated dose. The treated mice were kept from feed and water for 24 hours following treatment, then the mice were sacrificed and the intestinal tract examined for the presence of the tapeworms. If 60% or more of the mice were completely cleared of tapeworms the test was replicated and if the results were confirmed, additional groups of parasitized mice were treated with successively lower dosages of the test compound, to ascertain the minimum dosage required to clear 60% or more of the mice completely of the cestodes.

Safety factor

This is expressed as the ratio of maximum tolerated dose (M.T.D.) to the minimum effective dose (M.E.D.).

Compounds of the invention were evaluated according to this procedure and the results were as follows:

| Compound | M.T.D. (mg./kg.) | M.E.D. (mg./kg.) | Safety factor |
|---|---|---|---|
| 5-chloro-N-(6-chloro-1,2,3-benzothiadiazol-7-yl)-salicylamide | 1,000 | 62 | 16 |
| N-(1,2,3-benzothiadiazol-6-yl)-5-chlorosalicylamide | 1,000 | 250 | 4 |
| 5-chloro-N-(4,6-dichloro-1,2,3-benzothiadiazol-7-yl)-salicylamide | | 62 | |

The compounds of this invention are employed as anthelmintics for the control of tapeworm infestations in warm-blooded animals using conventional means and techniques employed in the anthelmintic art.

The dosage of the cesticide to be used will depend upon the particular cesticide to be used, the kind of host animal, whether the cesticide is to be used to cure an already existing infection, or merely as a prophylactic, and the like. These factors are those ordinarily encountered in the treatment of animals to cure and/or prevent their infestation by cestodes; these factors and their solution all are well known to the practitioners of the art. In general, however, larger dosages are required to cure an already existing infestation than are required for prophylaxis. Thus, dosages of the cesticide to provide as little as 1 milligram of the cesticide per kilogram of the live body weight of the animal fed at regular intervals—twice daily or daily, for example, may be sufficient to prevent infestation of animals by cestodes. However, prophylactic dosages ordinarily will amount to about 2–10 milligrams of the cesticide per kilogram of the animal body weight. The dosage required to eradicate already existing endoparasites ordinarily will be at least about 10 milligrams of the cesticide per kilogram of the animal body weight, with usual dosages being about 10 to 100 milligrams on the same basis. The maximum dosage, of course, in every case will be determined by the toxicity of the cesticide to the host animal. The cesticide of this invention provide an excellent safety factor—effectively eradicating cestodes without ill effect upon the host animal.

I claim as my invention:

1. Novel compounds defined by the formula:

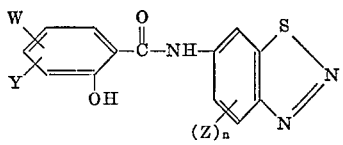

wherein W represents halogen, nitro, trifluoromethyl, methanesulfonyl or cyano; Y and Z each can be hydrogen or one of the moieties represented by W; $n$ is 1 or 2.

2. Compounds according to claim 1 wherein W is middle halogen; Y is hydrogen or middle halogen; Z is hydrogen or middle halogen; and $n$ is 1 or 2.

3. Compounds according to claim 2 wherein W is chlorine, Y is hydrogen, Z is chlorine and $n$ is an integer of 1 or 2.

4. Compounds according to claim 3 wherein $n$ is 1.

5. Compounds according to claim 3 wherein $n$ is 2.

6. A compound as in claim 3, said compound being 5 - chloro-N-(6-chloro-1,2,3-benzothiadiazol-7-yl)-salicylamide.

7. Compounds according to claim 3 wherein W is chlorine, Y is hydrogen and Z is hydrogen.

References Cited

UNITED STATES PATENTS

| | | | |
|---|---|---|---|
| 3,275,646 | 9/1966 | Kirby et al. | 260—304 |
| 3,536,728 | 10/1970 | Yates et al. | 260—304 |

ALEX MAZEL, Primary Examiner

R. J. GALLAGHER, Assistant Examiner

U.S. Cl. X.R.

424—270, 232